United States Patent

Drew et al.

[11] Patent Number: 5,484,219
[45] Date of Patent: Jan. 16, 1996

[54] SIX-DEGREE-OF-FREEDOM COMPLIANCY/BREAKAWAY DEVICE

[75] Inventors: Douglas R. Drew; Michael A. Paul; V. Edward Stubbs, III, all of Lynchburg, Va.

[73] Assignee: The Babcock & Wilcox Company, New Orleans, La.

[21] Appl. No.: 200,047

[22] Filed: Feb. 22, 1994

[51] Int. Cl.⁶ ........................................... F16D 3/02
[52] U.S. Cl. .................................. 403/57; 403/24; 403/41; 403/53; 414/730; 901/28
[58] Field of Search .................. 403/57, 53, 58, 403/2, 41, 24, 31, 74, 72, 73; 414/729, 730, 736; 901/35, 39, 29, 28; 74/490.2, 490.3, 490.4, 490.5, 490.6, 479.1

[56] References Cited

U.S. PATENT DOCUMENTS

| | | | |
|---|---|---|---|
| 4,367,591 | 1/1983 | Hirabayashi et al. | 403/52 X |
| 4,639,184 | 1/1987 | Knasel et al. | 414/730 |
| 4,723,460 | 2/1988 | Rosheim | 403/58 X |
| 4,786,769 | 11/1988 | Knasel et al. | 414/730 X |
| 4,819,496 | 4/1989 | Shelef | 901/29 X |
| 4,884,670 | 12/1989 | McCormick et al. | 901/29 X |
| 4,932,806 | 6/1990 | Ekland et al. | 403/57 |
| 4,954,005 | 11/1990 | Knasel et al. | 403/57 |
| 4,990,022 | 2/1991 | Watanabe et al. | 901/28 X |
| 5,040,915 | 8/1991 | Stuart et al. | 403/325 X |
| 5,147,174 | 9/1992 | Gossler et al. | 901/35 X |
| 5,205,701 | 4/1993 | Kigami et al. | 403/322 X |

OTHER PUBLICATIONS

PFA Modular Automation Components, Catalog #424; Intro page; Index page, Tab D. pp. D57G–D63G; Tab E, pp. E64G–E69E; Back cover–inside; Back cover.
Schunk Spann–und Greiftechnik Gripping Systems '91 Update; p. 10; pp. 27.1–27.4; Inside back cover, Back cover.
Robotic Accessories Product Catalog '92; pp. 2–29; pp. 71–76; Back cover.

Primary Examiner—Kenneth J. Dorner
Assistant Examiner—Harry C. Kim
Attorney, Agent, or Firm—Robert J. Edwards; Eric Marich

[57] ABSTRACT

A compliancy joint for a robot has six degrees of compliancy freedom and comprises a housing having an inner ring. A float block is movably disposed in the interior of the housing and a plurality of circumferentially arranged pneumatic cylinders on the housing apply force circumferentially to the float block. Sensors are used to detect when the float block is near its compliancy limit and a controller is operatively connected to the sensors and the cylinders for preventing the float block from reaching its compliancy limit. This joint is able to break away from the robot should the robot exceed the device's compliancy limit, preventing damage to the robot and robot end of arm tooling.

20 Claims, 3 Drawing Sheets

SIX-DEGREE-OF-FREEDOM COMPLIANCY/BREAKAWAY DEVICE

FIELD AND BACKGROUND OF THE INVENTION

The present invention relates, in general, to robotics and, in particular, to a new and useful compliancy joint for providing six degrees of compliance between a robot and a tool.

In the robotics field, most compliance devices such as joints are made of elastic material, i.e. elastic polymers, which provide a three to five degree of freedom compliancy at best. Additionally, these known compliancy devices do not provide great load bearing capability.

Furthermore, it is common for these compliancy devices to be connected directly to a face plate of a robot. Thus, in the event that the robot accidentally strikes a surface at the compliancy device, there is a strong possibility that damage will be incurred to the robot.

Presently, there is no known device for providing a compliancy joint for a robot and a tool which allows for six degrees of compliancy. There are also no known compliancy joints which utilize a controlled disengaging feature.

SUMMARY OF THE INVENTION

The present invention is a compliancy joint which provides six degrees of compliancy freedom between two plates, i.e. a robot arm and an end effector such as a tool. The six degrees of freedom compliancy is achieved while retaining rigidity and support of the compliance joint.

A compliancy joint comprises a housing having an inner ring. A float block is movably disposed in the interior of the housing. The housing is connected to the robot arm while the float block is connected to a tool. A plurality of pneumatic cylinders are circumferentially arranged on the housing to apply force to the float block, while allowing the float block to move within the housing. Sensors are used to detect when the float block is near its compliancy limit; and a controller is operatively connected to the sensors and the cylinders for preventing the float block from reaching its compliancy limit.

The present invention regulates force on the joint prior to the compliance limit being reached. By adjusting the amount of force applied to the joint, the compliancy limit never occurs, and thus allows the user to change the end effector or to debug the system.

Force is applied to the float block by varying air pressure to the pneumatic cylinders for changing the compliancy. This greatly reduces design guess work when dealing with unknown weights carried by the end effectors or tools of the robot. By regulating the air pressure to the pneumatic cylinders, the acceleration of the robot can be accomodated that the joint can handle a heavy object at the end effector as well as account for the movement needed during placement of the object.

A plurality of breakable fingers are connected to the float block and are positioned with the inner ring of the housing. This "self-destruction" or breakaway feature ensures that in the event the robot collides with an immovable object, damage to the robot is prevented because the fingers break away from the float block to permit disengagement of the float block from the housing.

When the compliancy joint is near the compliancy limit, the sensor sends an emergency stop signal to a controller for halting the movement of the robot in order to prevent damage to the joint.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
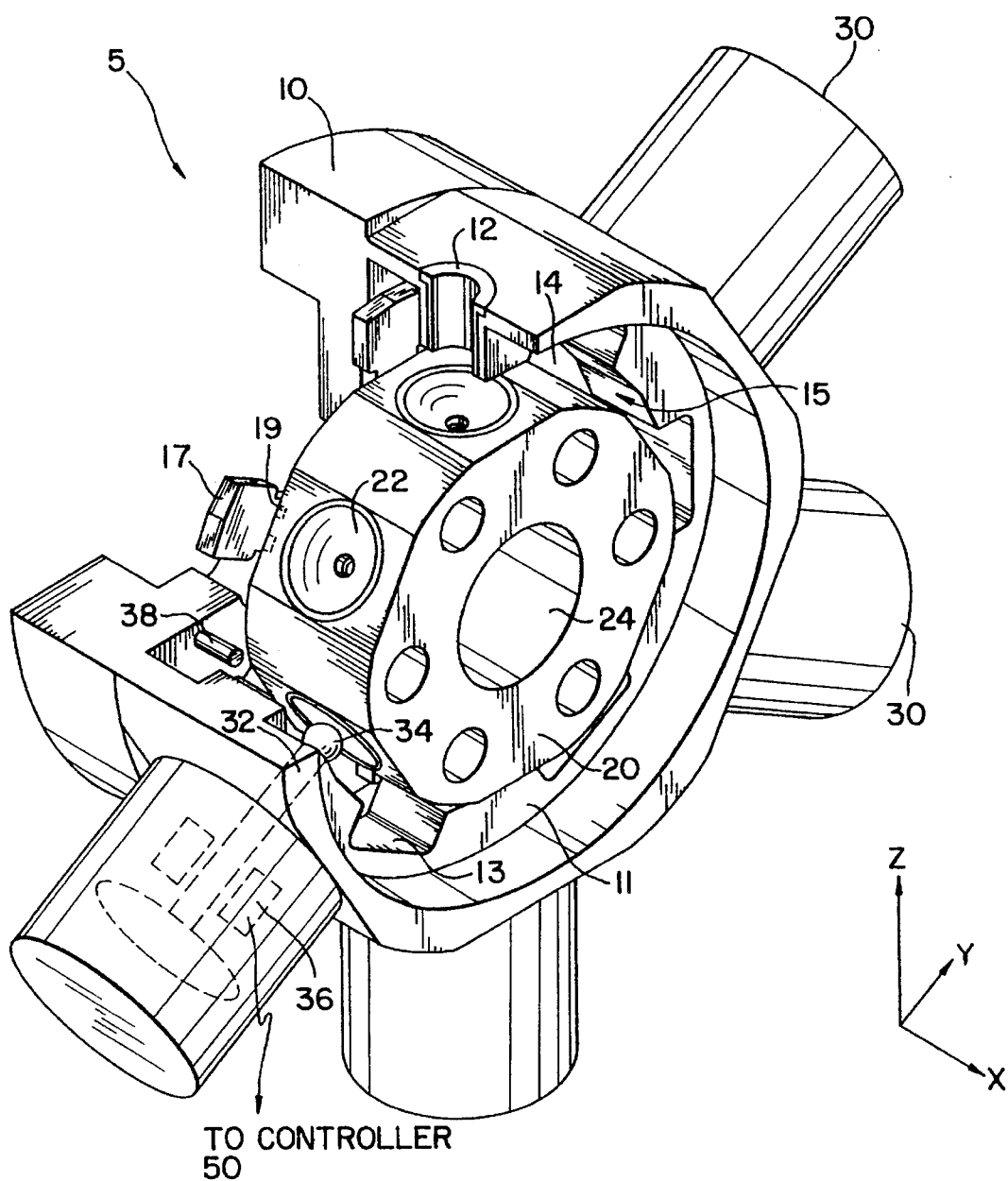
FIG. 1 is a sectional view of a compliancy joint according to the present invention.

As illustrated in FIG. 1, the present invention is a compliancy joint 5 comprising a circular housing 10 having a circular float block 20 movably disposed within an interior cavity 14 of the housing 10. The housing 10 is a hollow, cup-shaped component which is rigid and rugged. A hole 24 extends through the housing 10 and the float block 20, which permits air to be supplied to the joint 5 itself or to an end effector, sometimes referred to as "end of arm tooling", that is required for a particular application. The housing 10 is mounted to a robot 60 (FIG. 3), for instance, through any suitable securing means.

Housing 10 has a plurality of bushings 12 inserted therethrough for accommodating pneumatic cylinders 30. Six pneumatic cylinders 30 are arranged circumferentially around the outer surface of housing 10 for applying force to float block 20 within housing 10. Cylinders 30 can be any type of commercially available cylinder; the preferred embodiment used a Model No. FO-17-0.875-EE0.27-NT-M, manufactured by Bimba Manufacturing Co.

Float block 20 has a plurality of hardened, conical detents 22 arranged circumferentially around the outer surface and in direct alignment with bushings 12 of the housing 10. Each pneumatic cylinder 30 has a piston rod 32 having a tooling ball 34 at one end which is engageable with the detents 22 of the floating block 20. Bushings 12 support the cylinder rods 32 of pneumatic cylinder 30 against side forces which could cause the joint 5 to bind.

Because the floating block 20 is connected to an end effector such as a tool, the end effector is held in place by applying force through cylinders 30 on floating block 20. The detents 22 repeatably position the float block 20 at a center of compliance or nominal home location within the housing as cylinders 30 act upon the block 20.

The arrangement according to the present invention, as described above, ensures that the float block 20 has six degrees of compliance and is movable in a plurality of directions, i.e. movable on the X-axis, the Y-axis and the Z-axis, rotation about the X-axis, the Y-axis and the Z-axis.

The force from each cylinder 30 applied to detent 22 allows the floating block 20 to resist forces that cause axial and rotational movement from its nominal position.

Housing 10 has an internal support ring 11 arranged circumferentially around the interior of housing 10 and extending from the inner circumference of housing 10 toward the center of the cavity 14. The internal support ring 11 has a plurality of blocking portions 15 which are spaced apart from each other. A slot 13 is provided between pairs of blocking portions 15.

Floating block 20 has a plurality of breakable fingers 17 secured to the floating block by finger restraining pins 19, advantageously roll or grooved pins. Each finger 17 is positioned behind the blocking portions 15 of the internal support ring 11. The breakable fingers 17 in alignment with the blocking portions 15 prevent the floating block 20 from disengaging from the housing 10. The fingers 17 provide sufficient support, in the event of an air pressure loss, in order to hold the float block 20 within housing 10 due to the blocking provided by the blocking portions 15 at the internal support ring 11.

Upon assembly, the float block 20 is inserted into the interior cavity 14 of housing 10 by channeling fingers 17 though the slots 13. Once the fingers 17 are positioned behind blocking portions 15 of the internal support ring 11, the float block 20 is rotated such that fingers 17 are aligned directly behind blocking portions 15 and pressure is applied to the float block 20 by pneumatic cylinders 30 in order to lock the float block 20 in place at its center of compliance. This "turn and lock" feature is incorporated into the present invention in order to prevent accidental disassembly of the float block 20 from the housing 10 (such as in the case of a loss in air supply).

Fingers 17 are designed and mounted in a manner which is strong enough to prevent the float block 20 from disengaging from housing 10, but which will break when the fingers 17 forcibly contact blocking portions 15 in the event of a collision of gripper assembly 40 (FIG. 3) of the robot 60 against a surface. The breaking of the fingers 17 permits the float block 20 to disengage from housing 10. The "breaking" of the fingers 17 is actually a separation of the groove pins 19 from the float block 20.

Additionally, an anti-rotation device, such as an over-rotation pin 38, outwardly extends from the back of the housing 10 into one of the slots 13 between a pair of blocking portions 15 of the inner ring 11 for preventing the fingers 17 and float block 20 from rotating to a degree which would force tooling ball 34 of piston rods 32 from detents 22. The over-rotation pin 38 is not used providing a quick-tool change feature is desired.

Figure 2:
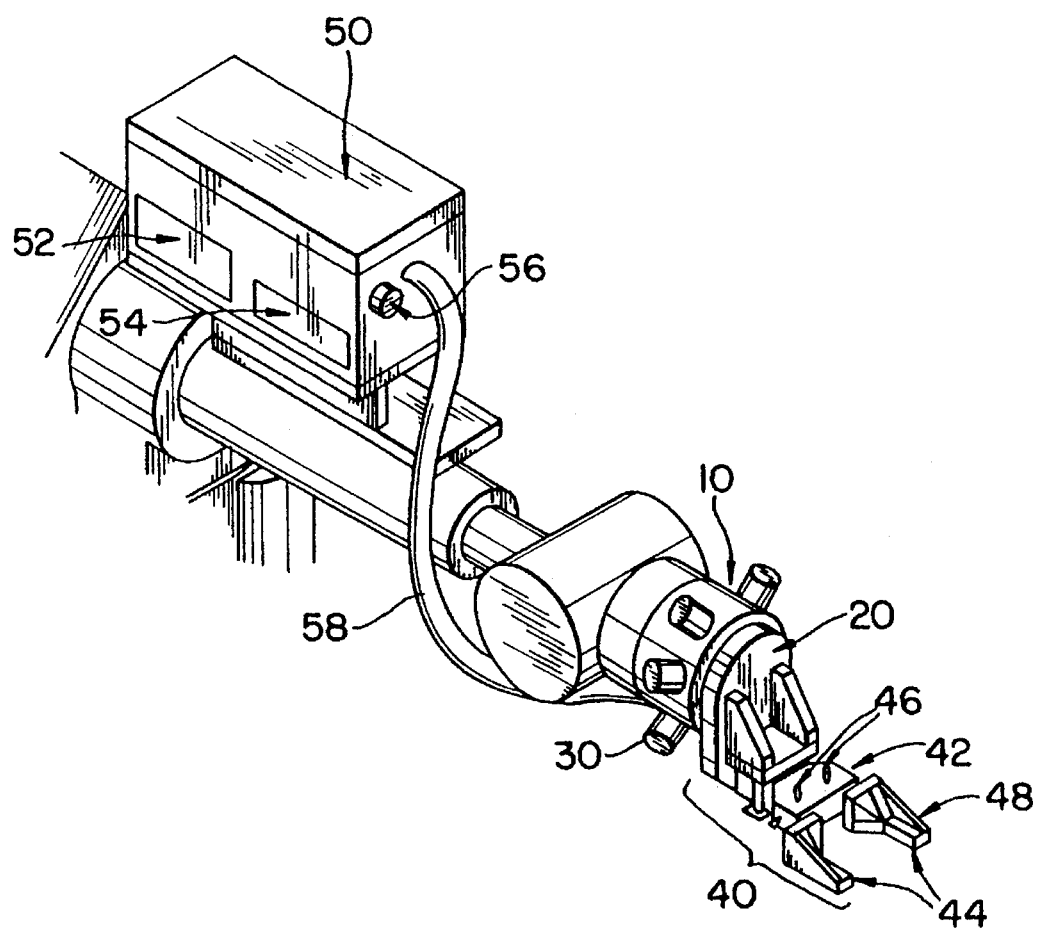
FIG. 2 is a perspective view of the joint of FIG. 1 used in conjunction with a robot arm and robot grippers.
Figure 3:
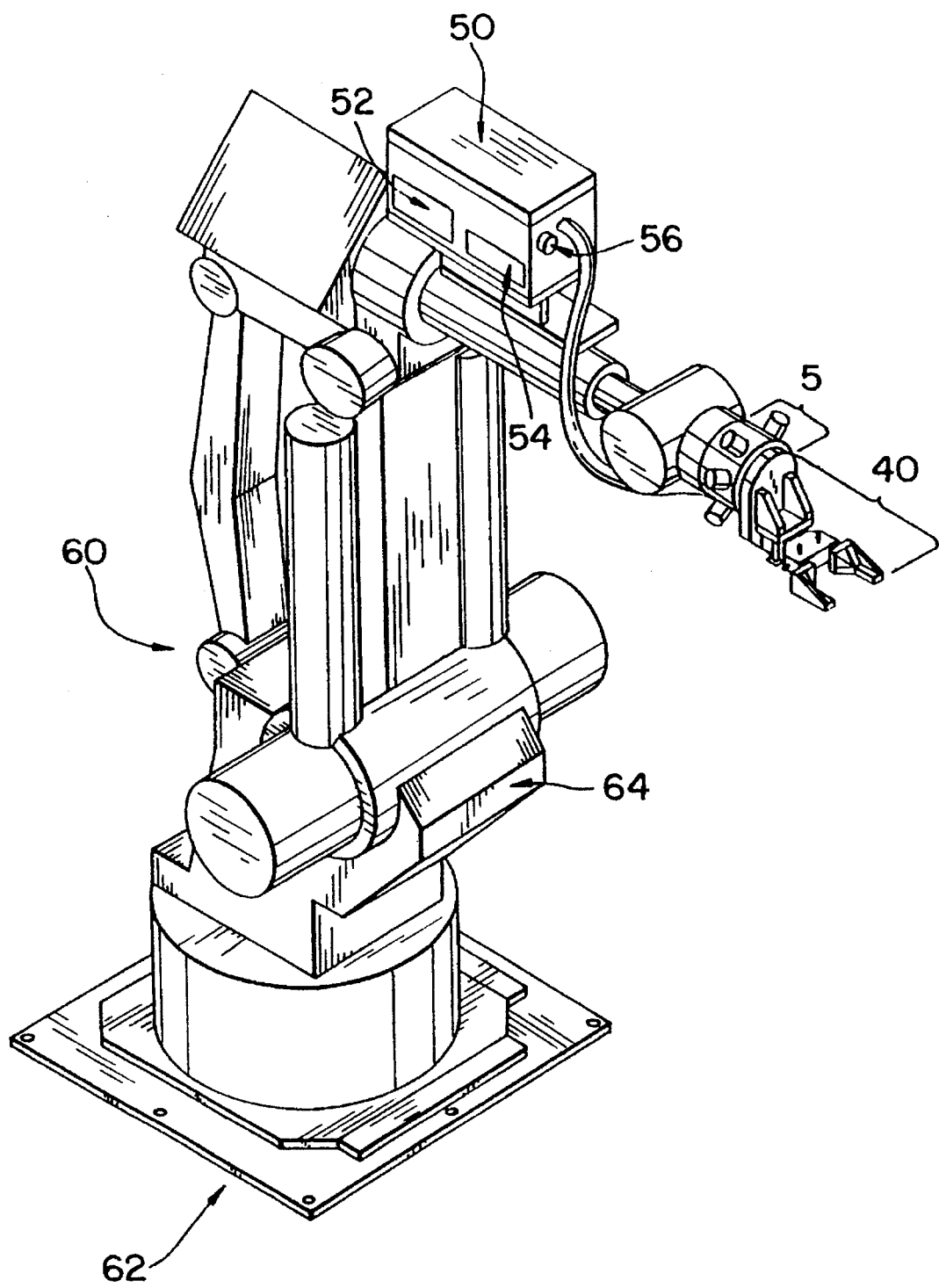
FIG. 3 is a perspective view of the joint of FIG. 1 used in conjunction with a robot system.

Sensors 36 are used in conjunction with each cylinder 30 for detecting when the joint 5 is reaching its compliancy limit, which if reached, could cause damage to the joint 5. Sensors 36 detect when the joint 5 is nearing the compliancy limit and emit an emergency-stop signal to controller 50 as illustrated in FIGS. 2 and 3. Sensing prior to the limit permits "over travel" once the emergency signal is detected and allows the robot to decelerate and stop before it reaches the compliancy limit. For example, if the pneumatic cylinders 30 are arranged for a usable travel of 0.5", the sensors 36 would be located so as to sense when the pneumatic cylinders 30 have traveled approximately half way of the usable travel (i.e., 0.25"). At that point, the sensors 36 would emit the emergency stop signal and deceleration of the robot would begin to halt its travel before the compliancy limit is reached. Sensors 36 can be any suitable type of limit switch sensors, including Hall effect sensors or reed switches mounted directly to the cylinders 30.

Controller 50 is are located within a robot arm enclosure and includes a compliancy and value regulator valve/regulator means located behind access cover 52, and gripper flow control and valve/regulator means located behind access cover 54. The compliancy valve/regulator means is used to vary pressure transmitted to the cylinders 30 to accommodate different load conditions. For example, when the robot loads a part into a machine, the air pressure to cylinders 30 is reduced to provide more compliance and protect the machine being loaded. When transferring a part between machines, air pressure to cylinders 30 is increased to stiffen the arm so that higher inertial forces due to higher speed movement can be accommodated. A compliance pressure gage 56 is used to monitor air pressure. A flexible umbilical conduit 58 contains the necessary pneumatic hoses which provide the needed air for the cylinders 30 to apply force to the floating block 20, as well as to any end of arm tooling if needed. Umbilical conduit 58 also encloses any electrical wiring required to transmit sensing and/or control signals between the controls 50 and the cylinders 30 and any end of arm tooling. It will be noted that hoses supplying pneumatic air to each individual cylinder 30 would, of course, be provided but these hoses have been omitted from the drawings for the sake of clarity.

FIG. 2 illustrates the end effector as a gripper assembly 40 comprising gripper fingers 44 movably connected to a pneumatic gripper actuator 42 which is in turn connected to the float block 20. Open/close sensors 46 are located on actuator 42 and a pan presence sensor 48 is located on the gripper fingers 44.

As shown in FIG. 3, the entire assembly of robot 60 is mountable on base plate 62 and includes a manipulator 64.

There are several advantages to the present invention as outlined below. First, the present invention allows for six degree-of-freedom compliancy which is not found in any of the known devices. Second, as long as the float block 20 is made of a non-conducting material, the present invention ensures for electrical isolation of the joint 5.

Third, the joint 5 has the ability to be reset so that the end effector can be situated at a repeatable location after undergoing a compliance condition. Fourth, the radial orientation of the pneumatic cylinders provides a joint with six degrees of freedom compliance, and the radial orientation provides a joint that is inherently stiffer in its roll compliancy; i.e., rotation in an axis perpendicular to the robot arm face plate.

Fifth, the axial travel of the air cylinder pistons under compliancy in any direction, allows for sensors to detect an over travel condition, and allow emergency stopping, providing "over travel" protection of the device.

Sixth, the design allows for accommodation of much higher loads than permitted with any of the known systems.

Seventh, the compliancy joint of the present invention is able to break away from the robot should the robot exceed the device's compliancy limit, preventing damage to the robot and any end of arm tooling.

The present invention is not limited to a pneumatic force system and any type of force applying system can be used in the joint such as hydraulic or spring loaded force systems. Thus, while specific embodiments of the invention have been shown and described in detail to illustrate the application of the principles of the invention, it will be understood that the invention may be embodied otherwise without departing from such principles.

We claim:

1. A six-degree of freedom compliancy joint for use between a first part and a second part, the joint comprising:

a housing having an interior, the housing connected to the first part;

a float block movably disposed within the interior of the housing and movable in a plurality of directions, the float block connected to the second part, the float block having a compliancy limit of six-degrees of freedom;

force means for applying force on the float block for centering the float block within the housing while allowing the float block to move within the housing;

release means for releasing the float block from the housing, the release means including an internal support circumferentially extending within the interior of the housing, the internal support having a plurality of blocking portions spaced apart from each other, and a plurality of fingers connected to the float block, each finger located behind a blocking portion of the internal support; and sensing means for sensing when the float block is near the compliancy limit.

2. The joint according to claim 1, wherein the internal support further includes a slot between each blocking portion.

3. The joint according to claim 2, including a pin connected to the housing and extending into the slot between said each blocking portion of the internal support.

4. The joint according to claim 1, wherein the force means comprises at least one pneumatic cylinder means.

5. The joint according to claim 4, wherein the sensing means is located at the pneumatic cylinder means.

6. The joint according to claim 5, wherein the sensing means comprises at least one limit switch on the pneumatic cylinder means.

7. The joint according to claim 6, wherein the limit switch comprises a Hall effect switch.

8. The joint according to claim 6, wherein the limit switch comprises a reed switch.

9. The joint according to claim 1, wherein the fingers are releasably connected to the float block.

10. The joint according to claim 1, wherein the housing and the float block have a hole therethrough.

11. The joint according to claim 1, wherein the housing is circular.

12. The joint according to claim 1, wherein the float block is circular.

13. The joint according to claim 1, wherein the force means comprises hydraulic cylinder means.

14. The joint according to claim 1, further comprising:

control means operatively connected to the sensing means and the force means for controlling the force applied to the float block and for preventing the float block from reaching the compliancy limit.

15. The joint according to claim 14, wherein the control means is operative to vary the force applied by said force means to accommodate different load conditions, reducing the force as required to provide more compliance in the joint, and increasing the force as required to provide less compliance in the joint.

16. A six-degree of freedom compliancy joint for use between a first part and a second part, the joint comprising:

a housing having an interior, the housing connected to the first part;

a float block movably disposed within the interior of the housing and movable in a plurality of directions, the float block connected to the second part, the float block having a compliancy limit of six degrees of freedom;

at least one pneumatic cylinder force means for applying force on the float block for centering the float block within the housing while allowing the float block to move within the housing; and sensing means located at the pneumatic cylinder force means for sensing when the float block is near the compliancy limit.

17. The joint according to claim 16, wherein the sensing means comprises at least one Hall effect limit switch on the pneumatic cylinder force means.

18. The joint according to claim 16, wherein the sensing means comprises at least one reed limit switch on the pneumatic cylinder force means.

19. The joint according to claim 16, further comprising control means operatively connected to the sensing means and the pneumatic cylinder force means for controlling the force applied to the float block and for preventing the float block from reaching the compliancy limit.

20. The joint according to claim 19, wherein the control means is operative to vary the force applied by said pneumatic cylinder force means to accommodate different load conditions, reducing the force as required to provide more compliance in the joint, and increasing the force as required to provide less compliance in the joint.

* * * * *